Patented Apr. 22, 1947

2,419,240

UNITED STATES PATENT OFFICE 2,419,240

TREATING IRON SALT SOLUTIONS

Howard R. Wilson, Lakewood, Ohio, assignor to National Carbon Company, Inc., a corporation of New York No Drawing. Application January 7, 1944, Serial No. 517,467

7 Claims. (Cl. 23—119)

This invention relates to the treatment of iron salt solutions for the recovery of iron compounds therefrom and has for its primary object an improved economical method of treating such solutions whereby valuable materials are produced. More particularly, the chief object of the invention is the production, from these solutions of iron salts and ammonia, of ammonium salts of high purity and of good crystalline appearance and the separation of black, granular iron hydrates or oxides of useful properties.

Suitable methods of disposal of iron salt solutions, such as the waste pickle liquors produced in the steel, titanium pigment, metal coating, and the like industries, have been sought for many years. Processes for the recovery of values in these liquors have been quite generally uneconomical, so that enormous quantities of acidic iron solutions and salts have been wasted to streams and other bodies of water, giving rise to objectionable pollution. In some areas, steel works have been compelled to treat their effluent liquors with lime to eliminate the harmful effects of free acid in these wastes. This neutralization with lime, however, either gives rise to a secondary disposal problem, or the pollution is only partially alleviated. Successful methods for the disposal of the waste iron liquors must ultimately be those in which all values are separated from solution, and whatever materials are formed must be disposed of in a manner so that they will not be carried back into streams or other bodies of water.

The utilization of by-product ammonia is also a problem at those steel works where by-product coke ovens are operated in the preparation of fuels for the blast furnace. Most of the ammonia from this source is consumed in the vicinity of the coke ovens, either to make ammonium sulfate by direct removal of the gas from the fuel gases by reaction with concentrated sulfuric acid, or the ammonia is absorbed in water to form ammonia liquor, which is either refined by distillation to produce household ammonia or is sold to chemical plants for the production of ammonium salts, such as ammonium chloride, commercial grades of acids being used for the neutralization of this liquor. Many attempts have been made to substitute waste iron sulfate and iron chloride solutions in the production of the corresponding ammonium salts since these are often available near the source of the ammonia liquor. The principal obstacle encountered is the formation of iron precipitates, which are filtered or settled with difficulty, so that the production of iron-free grades of ammonium salts has been uneconomical because of elaborate methods of handling requiring complicated filtration steps or expensive aeration under pressures considerably above atmospheric conditions.

Numerous proposals for treating waste pickle liquors have been advanced in the past, several of which suggest mixing such liquors with ammonia liquors to recover valuable iron and ammonium compounds therefrom. A common disadvantage of these proposed processes is that large quantities of ferrous hydroxide are formed which are removed from the ammonia solution only with difficulty. In one proposed process, mixing of waste pickle liquor and ammonia is conducted under superatmospheric pressure to avoid the formation of ferrous hydroxide. This process suffers from the disadvantage of requiring expensive apparatus for carrying out the desired reactions under pressure. Because of the disadvantages of all of these processes, the problem of providing an economical, commercially practicable treatment of waste pickle liquors and ammonia liquors has remained unsolved.

This problem is solved by the present invention which comprises a simple method of treating waste pickle liquors with ammonia at atmospheric pressure to recover separately commercially pure iron and ammonium compounds. Generally, the invention comprises mixing iron salt solutions with ammonia under carefully controlled oxidizing conditions at a carefully controlled pH to produce at atmospheric pressure a pure precipitate of black, granular iron (ferroso-ferric) hydrate and a clear, pure solution of ammonium salt from which solution a pure white crystalline ammonium salt may be produced simply by evaporation to dryness.

In accordance with the invention, an iron salt solution, such as a waste pickle liquor, is slowly added to a volume of a dilute aqueous solution of ammonia in a suitable vessel while ammonia is continuously added to the mixture at a rate sufficient to maintain the pH of the mixture above 7. The iron salt solution and ammonia are fed to the vessel at a rate consistent with the rate of reaction, so that no large concentration of unreacted iron salt or ammonia is allowed to build up in the reaction vessel, and preferably in stoichiometric proportion. For instance, if the iron salt solution consists of iron sulfate, not less than 2 mols of ammonia for each molecular equivalent of sulfuric acid, free and combined, present in the iron salt solution should be fed to the reaction mixture. The reaction mixture is preferably agitated since the stirring action increases the speed of reaction.

To precipitate a black, granular ferroso-ferric hydrate without precipitating ferrous hydroxide, or forming soluble ferrous complexes, it is necessary that the reaction mixture always be slightly alkaline. However, the mixture need not have a pH much greater than 7, and satisfactory results are obtained when only the faintest odor of ammonia from the reaction mixture is detectable.

The ammonia content may be as low as 0.1% to 0.2% of the weight of the reaction mixture although higher concentrations of ammonia can be used. Larger concentrations of ammonia cause the reaction to proceed at a more rapid rate, but with larger concentrations there may be some loss of ammonia by volatilization.

The invention is applicable to the treatment of iron salt solutions containing little or no ferric iron, but if less than about two-thirds of the total iron in the solution to be treated is in the ferric condition, it will be necessary to oxidize the solution so that about two-thirds of the total iron is in the ferric condition. In the method of the invention such oxidation may be accomplished in any manner known to the art before adding the solution to the reaction vessel but preferably is accomplished by aerating the reaction mixture, by admitting air to it, suitably through a diffuser element composed of a porous material such as the porous carbon described in Broadwell and Werking Patent No. 1,988,478. Such aeration not only oxidizes ferrous iron to ferric iron but also desirably agitates and thoroughly mixes the reaction mixture.

Although it is possible to precipitate ferrosoferric hydrate from iron salt solutions in accordance with the invention without the application of heat to the reaction mixture, best results are obtained if the reaction mixture is moderately heated. Preferably, the reaction mixture is maintained at a temperature between about 75° C. and 100° C.

The process of the invention is best carried out if a relatively large volume of reaction mixture is maintained in the reaction vessel. Under these conditions the desired reaction will take place in the presence of a relatively large "heel" of reacted slurry. Iron hydrate particles suspended in this slurry apparently serve as nuclei for the further crystallization or agglomeration of newly precipitated iron hydrates. Furthermore, the larger volume of reaction mixture provides a dilute concentration of reactants from which a coarse-grained precipitate is obtained. The coarse-grained precipitate of ferroso-ferric hydrate settles readily. It may also be separated rapidly from the solution by filtration.

The process of the invention may be carried out either as a batch-type operation or in a continuous manner. The reaction mixture may be withdrawn from the reaction vessel and introduced either into suitable filtering devices or settling tanks. Whether the precipitate of ferrosoferric hydrate is separated from the liquor by filtration or by settling, the filtrate or supernatant liquor is water-white and may be evaporated to dryness to produce white crystals of an ammonium salt without the need for purification steps.

Illustrative of the application of the method of the invention to the treatment of typical industrial waste iron salt solutions, the following examples are given.

Example I

One thousand volumes of water at 75° C. was placed in a reaction vessel of about 4000 volumes capacity, and 50 volumes of 18% ammonia solution was added. This starting solution was aerated by admitting air into the vessel through a porous carbon diffuser element. While heat was applied to the reaction vessel to maintain the temperature between 75° C. and 80° C., waste ferrous sulfate pickle liquor containing approximately 75 grams of ferrous iron per liter of solution, from 1% to 3% free sulfuric acid, and substantially no ferric iron and having a specific gravity of 22° Baumé was added to the dilute ammonia solution at a rate of 20 volumes per minute. The pickle liquor was at a temperature of about 103° C. While the pickle liquor was being added to the vessel, there was added 18% ammonia solution at a rate of 10 volumes per minute, the total amount of ammonia added up to any given time being slightly in excess of the stoichiometric quantity required for reaction with the iron sulfate and acid solution already introduced into the vessel. In this manner a slight excess of ammonia was maintained in the solution at all times, and an odor of ammonia was constantly discernible over the reaction mixture. A brownish-black precipitate of iron hydrate was formed. The precipitate was filtered, and the filtrate, a clear water-white solution of ammonium sulfate showed no test for soluble iron when it was made ammoniacal and treated with hydrogen peroxide. Had any iron compound been present in the filtrate, this test would have produced a red precipitate of ferric hydrate.

Example II

To 2,000 volumes of a slurry of iron hydrate and ammonium sulfate solution from a previous experiment held in a reaction vessel there was added 164 volumes of 18% ammonia solution. To this solution there was added, with stirring but without aeration, 1735 volumes of an iron sulfate solution at a rate of 50 volumes per minute. This solution contained 53.5 grams of ferric iron per liter and 17.1 grams of ferrous iron per liter, 75.8% of the iron being present in the ferric state. During the addition of the iron solution to the vessel there was introduced 900 volumes of 18% ammonia solution at a rate of 20 volumes per minute. The temperature of the reaction mixture was maintained at about 75° C. to 88° C. during these additions. A precipitate of ferrosoferric hydrate was produced. After separation of the precipitate by filtration, the filtrate was tested for iron and found to be substantially ironfree.

A quantity of a slurry of ferroso-ferric hydrate produced by an operation conducted in substantially the same manner as that just described was washed with water and allowed to settle. The settled slurry was then filtered on a stoneware nutsch filter to remove as much of the wash water as possible. The damp cake so produced was dried in an oven for 24 hours at 100° C. to 150° C. and then pulverized. A black, magnetic powder which analysis indicated to contain about 10% FeO, about 87% $Fe_2O_3$ and about 2% $SO_3$ was obtained.

The method of the invention is suited to the treatment of iron salt solutions containing any concentration of iron since precipitation is controlled by controlling the mixing of reactants, the oxidation level, and by controlling the pH of the reaction mixture. Either gaseous ammonia or aqueous ammonia may be used in the method of the invention with equally satisfactory results. The use of ammonia gas has the advantage that the concentration of the ammonium salt produced is greater than when aqueous ammonia is employed.

The method of the invention makes possible the recovery of valuable iron compounds from solutions containing iron salts by treatment with ammonia in a single reaction vessel and requires only a single settling or filtering step. The iron hydrates produced by the method of the invention are black, granular and, when dried in air, magnetic in character and are suitable for use in the production of iron powders or of black pigments. The supernatant liquor or filtrate obtained on removal of the iron hydrates by settling or filtration may be evaporated directly to dryness to obtain ammonium salt crystals of good appearance and marketability. If the iron salt solution originally treated contains chlorides, ammonium chloride suitable for use in galvanizing operations is obtained. If the iron salt solution originally contains sulfates, ammonium sulfate suitable for fertilizer and other uses is obtained.

No elaborate or expensive apparatus is required. The reaction vessel need be nothing more than an open top tank fitted with a mechanical stirring device and means for admitting air to the reaction mixture, and separation of the ferroso-ferric hydrate may be achieved in a simple thickener. If desired, the clear ammonium salt solution obtained on settling of the slurry may be recycled to absorb more ammonia gas, and the enriched solution fed to the reaction vessel.

Although specific examples of the application of the method of the invention to the treatment of iron salt solutions of particular composition have been given herein by way of illustration, the invention is not limited to or by such examples.

I claim:

1. A process of obtaining a black granular iron hydrate and an ammonium salt substantially free from iron, directly from ammonia and an iron salt, which comprises: providing an aqueous ammonia bath; introducing an aqueous solution of the iron salt into the bath and dispersing it in the bath as soon as introduced; maintaining in the bath sufficient ammonia to maintain the pH of the bath at a value greater than 7; so as to produce directly in the bath a solution of the ammonium salt corresponding to the acid radical of the iron salt and a granular precipitate of black iron hydrate; maintaining the dilution of the ammonium salt so high and introducing the iron salt into the bath so slowly that substantially no iron exists in soluble form in the bath; and separating said precipitate from the solution of the ammonium salt.

2. A process of obtaining a black granular iron hydrate and an ammonium salt substantially free from iron, directly from ammonia and an iron salt, which comprises: providing an aqueous ammonia bath; introducing an aqueous solution of the iron salt into the bath; maintaining in the bath sufficient ammonia to provide the stoichiometric amount of ammonia required to convert all of the acid radicals of the iron salt to the corresponding ammonium salt and also to maintain the pH of the bath at a value greater than 7; dispersing the iron salt in the bath substantially immediately upon its entry into the bath; so as to produce directly in the bath a solution of the ammonium salt corresponding to the acid radical of the iron salt and a granular precipitate of black iron hydrate; maintaining the dilution of the ammonium salt so high and introducing the iron salt into the bath so slowly that sbustantially no iron exists in soluble form in the bath; and separating said precipitate from the solution of the ammonium salt.

3. A process of obtaining a black granular iron hydrate and an ammonium salt substantially free from iron, directly from ammonia and an iron salt, which comprises: providing an aqueous ammonia bath; introducing an aqueous solution of the iron salt into the bath and dispersing it in the bath as soon as introduced, at least one-third of the iron content of the salt being in the ferrous condition; maintaining in the bath sufficient ammonia to maintain the pH of the bath at a value greater than 7; oxidizing the iron salt to such an extent that two-thirds of its iron content is in the ferric condition; so as to produce directly in the bath a solution of the ammonium salt corresponding to the acid radical of the iron salt and a granular precipitate of black iron hydrate; maintaining the dilution of the ammonium salt so high and introducing the iron salt into the bath so slowly that substantially no iron exists in soluble form in the bath; and separating said precipitate from the solution of the ammonium salt.

4. A process of obtaining a black granular iron hydrate and an ammonium salt substantially free from iron, directly from ammonia and an iron salt, which comprises: providing an aqueous ammonia bath containing iron; introducing an aqueous solution of the iron salt into the bath and dispersing it in the bath as soon as introduced; maintaining in the bath sufficient ammonia to maintain the pH of the bath at a value greater than 7; maintaining by oxidation about two-thirds of the iron in the bath in the ferric condition; so as to produce directly in the bath a solution of the ammonium salt corresponding to the acid radical of the iron salt and a granular precipitate of a black iron hydrate; maintaining the dilution of the ammonium salt so high and introducing the iron salt into the bath so slowly that substantially no iron exists in soluble form in the bath; and separating said precipitate from the solution of the ammonium salt.

5. A process of obtaining a black granular iron hydrate and an ammonium salt substantially free from iron, directly from ammonia and an iron salt, which comprises: providing an aqueous ammonia bath containing iron; introducing an aqueous solution of the iron salt into the bath and dispersing it in the bath as soon as introduced; maintaining in the bath sufficient ammonia to maintain the pH of the bath at a value greater than 7; aerating the bath to maintain about two-thirds of the iron in the bath in the ferric condition; so as to produce directly in the bath a solution of the ammonium salt corresponding to the acid radical of the iron salt and a granular precipitate of a black iron hydrate; maintaining the dilution of the ammonium salt so high and introducing the iron salt into the bath so slowly that substantially no iron exists in soluble form in the bath; and separating said precipitate from the solution of the ammonium salt.

6. A process of obtaining a black granular iron hydrate and an ammonium salt substantially free from iron, directly from ammonia and an iron salt, which comprises: providing an aqueous ammonia bath containing the granular black iron hydrate and the ammonium salt; introducing and dispersing in the bath as soon as introduced, an aqueous solution of the iron salt containing ferrous iron and sufficient ammonia to maintain the pH of the bath at a value greater than 7; aerating the bath to oxidize ferrous iron to ferric iron; maintaining the bath at a temperature between about 75° C. and 100° C.; so as to produce directly in the bath a solution of the ammonium salt corresponding to the acid radical of the iron salt and a granular precipitate of black iron hydrate; maintaining the dilution of the ammonium salt so high and introducing the iron salt into the bath so slowly that substantially no iron exists in soluble form in the bath; and separating said precipitate from the solution of the ammonium salt.

7. A process of obtaining a black granular iron hydrate and ammonium sulfate substantially free from iron, directly from ammonia and an iron sulfate containing ferrous sulfate, which comprises: providing an aqueous ammonia bath; introducing an aqueous solution of the iron sulfate into the bath and dispersing it in the bath as soon as introduced; maintaining in the bath sufficient ammonia to maintain the pH of the bath at a value greater than 7; aerating the bath to oxidize ferrous iron to ferric iron and maintain two-thirds of the iron in the ferric state; maintaining the bath at a temperature between about 75° C. and 100° C.; so as to produce directly in the bath a solution of ammonium sulfate and a granular precipitate of black iron hydrate; maintaining the dilution of the ammonium salt so high and introducing the iron salt into the bath so slowly that substantially no iron exists in soluble form in the bath; and separating said precipitate from the solution of the ammonium sulfate.

HOWARD R. WILSON.

REFERENCES CITED

The following references are of record in the file of this patent:

UNITED STATES PATENTS

| Number | Name | Date |
|---|---|---|
| 868,385 | Wulffing | Oct. 15, 1907 |
| 961,764 | Folding | June 21, 1910 |
| 997,237 | Carrick et al. | July 4, 1911 |
| 1,994,702 | Harris | Mar. 19, 1935 |
| 2,333,672 | Oliver | Nov. 9, 1943 |